(12) United States Patent
Kang et al.

(10) Patent No.: US 9,837,007 B2
(45) Date of Patent: Dec. 5, 2017

(54) IN-CELL TOUCH LIQUID CRYSTAL DISPLAY APPARATUS

(71) Applicant: LG DISPLAY CO., LTD., Seoul (KR)

(72) Inventors: In Kang, Daejeon (KR); TaeKeun Lee, Chilgok-gun (KR)

(73) Assignee: LG DISPLAY CO., LTD., Seoul (KR)

( * ) Notice: Subject to any disclaimer, the term of this patent is extended or adjusted under 35 U.S.C. 154(b) by 161 days.

(21) Appl. No.: 14/982,876

(22) Filed: Dec. 29, 2015

(65) Prior Publication Data

US 2016/0189582 A1    Jun. 30, 2016

(30) Foreign Application Priority Data

Dec. 31, 2014 (KR) .......................... 10-2014-0195736
Oct. 29, 2015 (KR) .......................... 10-2015-0151418

(51) Int. Cl.

| | |
|---|---|
| *G09G 3/00* | (2006.01) |
| *G06F 3/041* | (2006.01) |
| *G09G 3/36* | (2006.01) |
| *G02F 1/1333* | (2006.01) |
| *G02F 1/13* | (2006.01) |
| *G02F 1/1362* | (2006.01) |
| *G02F 1/1345* | (2006.01) |

(52) U.S. Cl.
CPC ........... *G09G 3/006* (2013.01); *G02F 1/1309* (2013.01); *G02F 1/13338* (2013.01); *G06F 3/0412* (2013.01); *G09G 3/3648* (2013.01); *G02F 1/136286* (2013.01); *G02F 2001/13456* (2013.01); *G02F 2001/136254* (2013.01); *G02F 2201/121* (2013.01)

(58) Field of Classification Search
CPC combination set(s) only.
See application file for complete search history.

(56) References Cited

U.S. PATENT DOCUMENTS

2007/0252614 A1    11/2007    Jeon
2008/0170195 A1    7/2008    Kwon et al.

*Primary Examiner* — Robin Mishler
(74) *Attorney, Agent, or Firm* — Dentons US LLP

(57) ABSTRACT

Disclosed is an in-cell touch liquid crystal display (LCD) apparatus comprising: an active area in which a plurality of pixels are provided; and a pad area in which an auto probe test pattern is disposed, wherein the auto probe test pattern comprises a common voltage enable signal line; a common voltage switching unit; a data enable signal line through which a data enable signal is applied; and a data switching unit that is coupled to the data enable signal line and configured to be turned on by the data enable signal and output a data voltage. The common voltage enable signal line and the data enable signal line are disposed separately from each other.

23 Claims, 11 Drawing Sheets

FIG. 3
(RELATED ART)
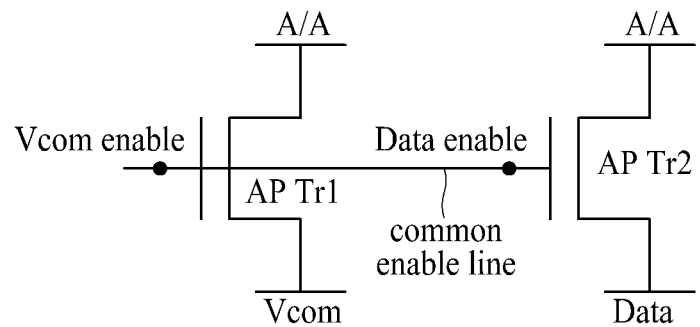
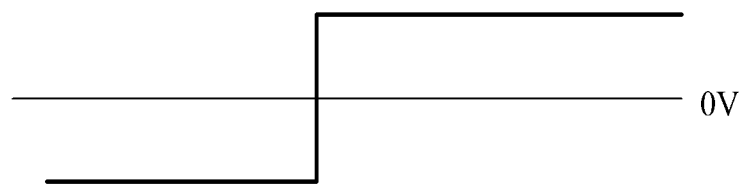
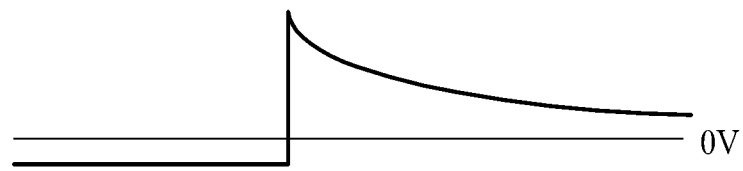

FIG. 6
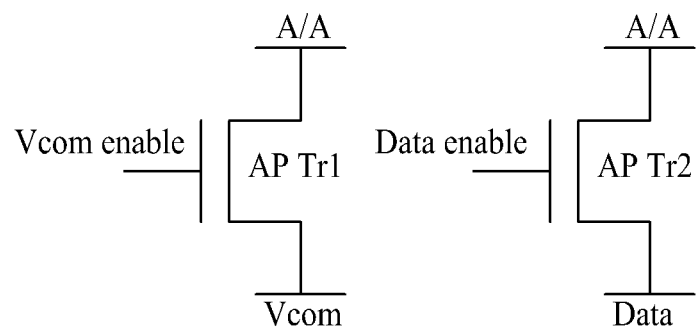
AP Data Signal (Tr. On) ±5V application
Low Gate enable1 voltage
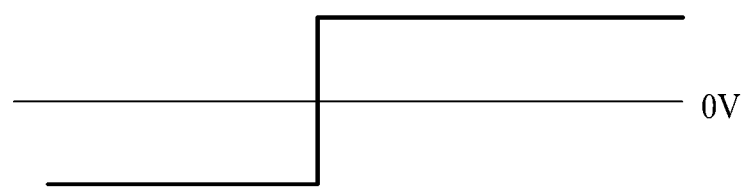
— 0V
AP Vcom Signal (Tr. On) -1V application
High Gate enable2 voltage
— 0V

FIG. 10
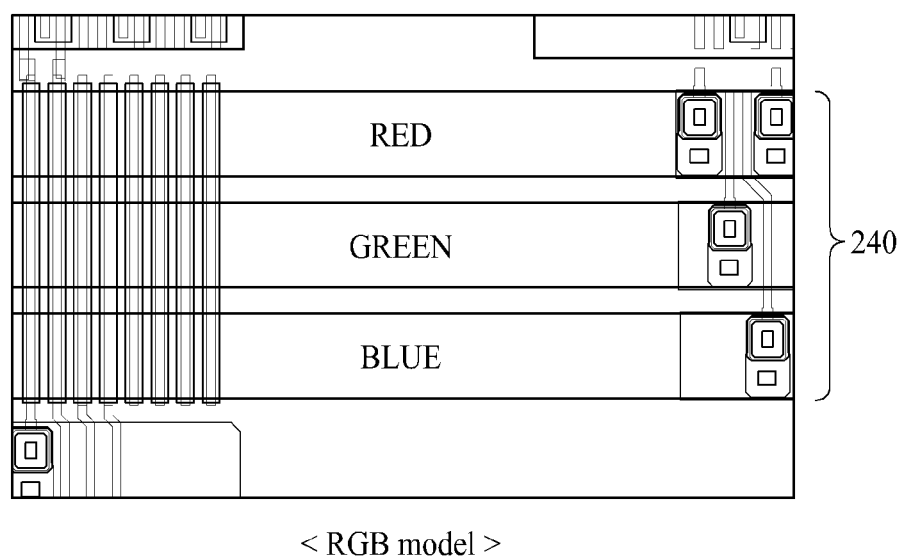
< RGB model >
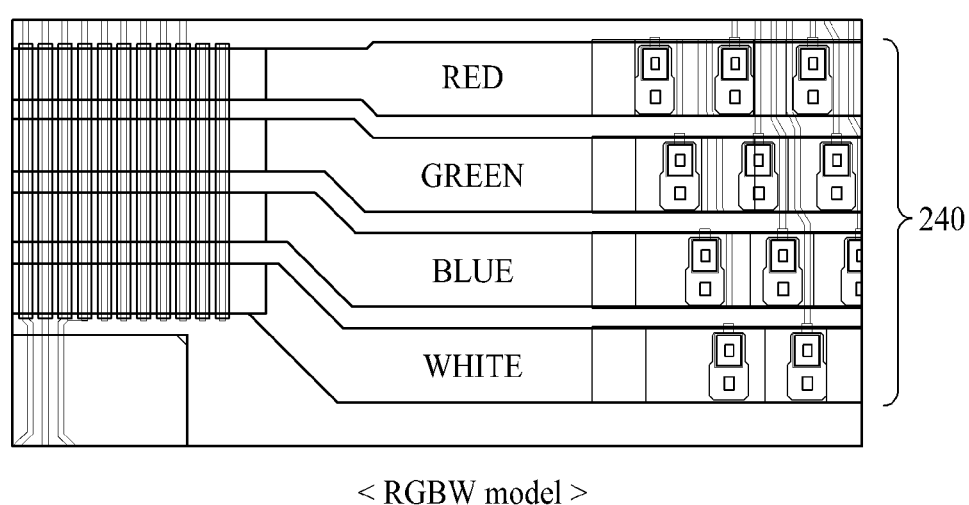
< RGBW model >

IN-CELL TOUCH LIQUID CRYSTAL DISPLAY APPARATUS

CROSS-REFERENCE TO RELATED APPLICATIONS

This application claims the benefit of the Korean Patent Application No. 10-2014-0195736 filed on Dec. 31, 2014, and Korean Patent Application No. 10-2015-0151418 filed on Oct. 29, 2015, which are hereby incorporated by reference for all purposes as if fully set forth herein.

BACKGROUND

Field of the Invention

The present invention relates to an in-cell touch liquid crystal display (LCD) apparatus in which an auto probe test pattern is provided in a pad area.

Discussion of the Related Art

Instead of a mouse or a keyboard applied as an input device of a display apparatus or a keypad applied as an input device of a portable electronic device, a touch screen that enables a user to directly input information with a finger or a pen is applied to display apparatuses. Since all users can easily manipulate the touch screen, the application of the touch screen is being expanded.

A touch screen is applied to monitors such as navigations, industrial terminals, notebook computers, financial automation equipment, and game machines, portable terminals such as portable phones, MP3 players, PDAs, PMPs, PSPs, portable game machines, DMB receivers, and tablet personal computers (PCs), and home appliances such as refrigerators, microwave ovens, and washing machines.

Recently, in-cell touch LCD apparatuses where a touch electrode (a touch sensor) is built into a cell of a liquid crystal panel have been developed for reducing the thickness and manufacturing cost of a touch display apparatus where a touch screen (a touch panel) is integrated with an LCD apparatus. The in-cell touch LCD apparatuses use a common electrode, which is disposed on a thin film transistor (TFT) array substrate of a liquid crystal panel, as a touch sensor.

FIG. 1 is a diagram illustrating a related art in-cell touch LCD apparatus 1.

Referring to FIG. 1, the related art in-cell touch LCD apparatus 1 includes an active area 10, where an image is displayed, and a pad area 20 disposed outside the active area 10.

A drive integrated circuit (IC) is mounted in or bonded to the pad area 20, and a plurality of link lines 21 and a plurality of touch routing lines 22 are disposed in the pad area 20. Also, an auto probe test pattern 30 is disposed in the pad area 20.

After a TFT array substrate is manufactured, an auto probe test process is performed for detecting a line defect such as short circuit and/or the like of lines disposed on a substrate, a defect of a TFT, a pixel pattern defect, etc.

To this end, the auto probe test pattern 30 for an auto probe test is disposed in the pad area 20 of a liquid crystal panel. By using the auto probe test pattern 30, a data voltage is applied to a data line, and a common voltage is applied to a common electrode line, whereby it is determined whether a plurality of lines and a plurality of pixels are normally provided on the TFT array substrate is tested.

FIG. 2 is a diagram illustrating an auto probe test pattern of a related art in-cell touch LCD apparatus, and FIG. 3 is a diagram illustrating a related art auto probe test method for an LCD apparatus.

Referring to FIGS. 2 and 3, an auto probe test pattern 30 of the related art in-cell touch LCD apparatus includes a common enable signal line 31, a common voltage switching unit 32, a data switching unit 33, a data signal line 34a, a common voltage line 34b, a data jumping part 35a, a common voltage jumping part 35b, a common voltage output pin bonding part 36, a data output pin bonding part 37, a common voltage link line 38, and a data link line 39.

The auto probe test pattern 30 of the related art in-cell touch LCD has a structure where an enable signal for the common voltage switching unit 32 and the data switching unit 33 is applied through the common enable signal line 31.

That is, a common voltage enable signal is applied to the common voltage switching unit 32 through the common enable signal line 31, and the common enable signal line 31 is disposed in order for a data enable signal to be applied to the data switching unit 33. In this case, a high voltage of ±5 V is applied as a data voltage, and a low voltage of −1 V is applied as a common voltage.

Even when performing an auto probe test identically to actual image driving, a polarity of a data voltage is inverted. In this case, if the common voltage switching unit 32 and the data switching unit 33 share the common enable signal line 31, a coupling phenomenon occurs where a common voltage is shifted according to a data voltage when the data voltage is inverted.

Due to the coupling of the data voltage and the common voltage, a time is expended in recovering the common voltage to the original common voltage (for example, −1 V). Also, the common voltage charged into a pixel is shifted due to the coupling, and for this reason, dimming occurs in a horizontal direction of a touch block.

That is, in the related art in-cell touch LCD apparatus, if the common voltage switching unit 32 and the data switching unit 33 of the auto probe test pattern 30 share the common enable signal line 31, horizontal-direction dimming occurs, and for this reason, an auto probe test cannot be normally performed.

The auto probe test pattern and the auto probe test method disclosed in this Background section was already known to the inventors of the present invention before achieving the present invention or is technical information acquired in the process of achieving the present invention. Therefore, it may contain information that does not form the prior art that is already known in this country to a person of ordinary skill in the art.

SUMMARY

Accordingly, the present invention is directed to provide an in-cell touch liquid crystal display (LCD) apparatus that substantially obviates one or more problems due to limitations and disadvantages of the related art.

An aspect of the present invention is directed to provide an in-cell touch LCD apparatus that prevents the coupling of a data voltage and a common voltage when performing an auto probe test.

Another aspect of the present invention is directed to provide an in-cell touch LCD apparatus that prevents the horizontal dimming of a touch block from occurring when performing an auto probe test.

Another aspect of the present invention is directed to provide an in-cell touch LCD apparatus that separately supplies a data enable signal and a common voltage enable signal when performing an auto probe test.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an in-cell touch liquid crystal display (LCD) apparatus in accordance with various embodiments comprises: an active area in which a plurality of pixels are provided; and a pad area in which an auto probe test pattern is disposed, wherein the auto probe test pattern comprises: a common voltage enable signal line through which a common voltage enable signal can be applied; a common voltage switching unit that is coupled to the common voltage enable signal line and configured to be turned on by the common voltage enable signal and output a common voltage; a data enable signal line through which a data enable signal can be applied; and a data switching unit that is coupled to the data enable signal line and configured to be turned on by the data enable signal and output a data voltage, and the common voltage enable signal line and the data enable signal line are disposed to be separated from each other.

In one or more embodiments, the auto probe test pattern further comprises a common voltage link line configured to receive the common voltage from the common voltage switching unit, and a data link line configured to receive the data voltage from the data switching unit.

In one or more embodiments, the auto probe test pattern further comprises: a common voltage jumping part coupled to the common voltage switching unit; and a drive IC bonding part coupled to the common voltage jumping part, wherein the common voltage output by the common voltage switching unit is applied through the common voltage jumping part to the drive IC bonding part. The common voltage link line may be coupled to the drive IC bonding part to receive the common voltage from the drive IC bonding part.

In one or more embodiments, the auto probe test pattern further comprises: a data signal line coupled to the data switching unit; and a drive IC bonding part coupled to the data signal line, wherein the data switching unit is configured to receive data signals (e.g., red, green and blue data signals, or red, green, blue and white data signals) from the data signal line and output the data signals to the drive IC bonding part. The data link line may be coupled to the drive IC bonding part to receive the data voltage from the drive IC bonding part.

In one or more embodiments, the common voltage switching unit comprises a plurality of common voltage switching thin film transistors configured to be turned on by the common voltage enable signal supplied through the common voltage enable signal line and output the common voltage.

In one or more embodiments, the data switching unit comprises a plurality of data switching thin film transistors configured to be turned on by the data enable signal supplied through the data enable signal line and output red, green, and blue data signals.

In one or more embodiments, the auto probe test pattern comprises a patterned gate metal layer, wherein the common voltage enable signal line comprises a first portion of the patterned gate metal layer and the data enable signal line comprises a second portion of the patterned gate metal layer physically separated from the first portion. The common voltage switching unit may comprise a third portion of the patterned gate metal layer and the data switching unit may comprise a fourth portion of the patterned gate metal layer physically separated from the third portion.

In one or more embodiments, the in-cell touch LCD apparatus further comprises a plurality of touch routing lines disposed in the pad area, and a drive IC coupled to the touch routing lines and configured to supply a touch driving signal to a touch electrode in the active area.

In another aspect of the present invention, a method of operating an in-cell touch liquid crystal display (LCD) apparatus according to one or more embodiments is provided, the method comprising: applying a common voltage enable signal to the common voltage enable signal line of the in-cell LCD apparatus; and applying a data enable signal to the data enable signal line of the in-cell LCD apparatus.

In one or more embodiments, the common voltage enable signal and the data enable signal are applied simultaneously.

In one or more embodiments, the method further comprises inverting a polarity of the data enable signal while applying the common voltage signal.

In one or more embodiments, applying the common voltage signal and the data enable signal comprises: applying the common voltage signal having a negative polarity to the common voltage signal line; and while applying the common voltage signal having the negative polarity to the common voltage enable signal line, applying the data enable signal having a negative polarity to the data enable signal line, subsequently changing the polarity of the data enable signal to a positive polarity, and subsequently applying the data enable signal having the positive polarity to the data enable signal line.

In another aspect of the present invention, a method of manufacturing an in-cell touch liquid crystal display (LCD) apparatus is provided, the method comprising: forming a plurality of pixels in an active area of the in-cell LCD apparatus; and forming an auto probe test pattern in a pad area of the in-cell LCD apparatus, wherein forming the auto probe test pattern comprises: forming a gate metal layer and patterning the gate metal layer so as to form a common voltage enable signal line through which a common voltage enable signal can be applied from a first portion of the patterned gate metal layer, and a data enable signal line through which a data enable signal can be applied from a second portion of the patterned gate metal layer, wherein the first and second portions of the patterned gate metal layer are physically separated from one another; forming a common voltage switching unit that is coupled to the common voltage enable signal line and configured to be turned on by the common voltage enable signal and output a common voltage; and forming a data switching unit that is coupled to the data enable signal line and configured to be turned on by the data enable signal and output a data voltage.

In one or more embodiments, the common voltage switching unit comprises a third portion of the patterned gate metal layer and the data switching unit comprises a fourth portion of the patterned gate metal layer, wherein the third and fourth portions of the patterned gate metal layer are physically separated from one another.

In one or more embodiments, the method further comprises forming a common voltage link line in the pad area and coupled to the common voltage switching unit so as to supply the common voltage to at least one common electrode in the active area, and forming a data link line in the pad area and coupled to the data switching unit so as to provide the data voltage to the plurality of pixels in the active area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 3 is a diagram illustrating a related art auto probe test method for an LCD apparatus;

FIG. 6 is a diagram illustrating an auto probe test method for an LCD apparatus according to an embodiment of the present invention;

FIG. 10 is a diagram illustrating a data signal line of an auto probe test pattern;

DETAILED DESCRIPTION OF THE INVENTION

Figure 1:
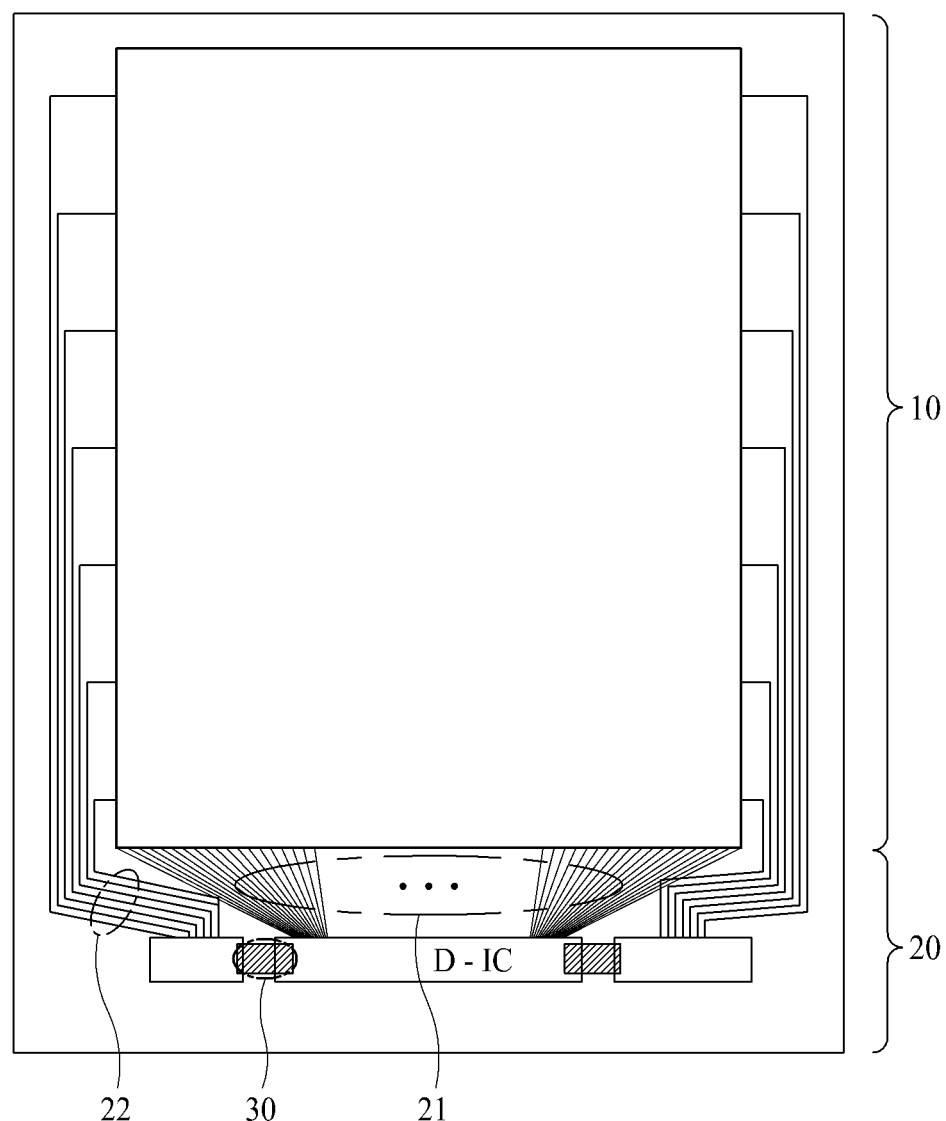
FIG. 1 is a diagram illustrating a related art in-cell touch LCD apparatus.
Figure 2:
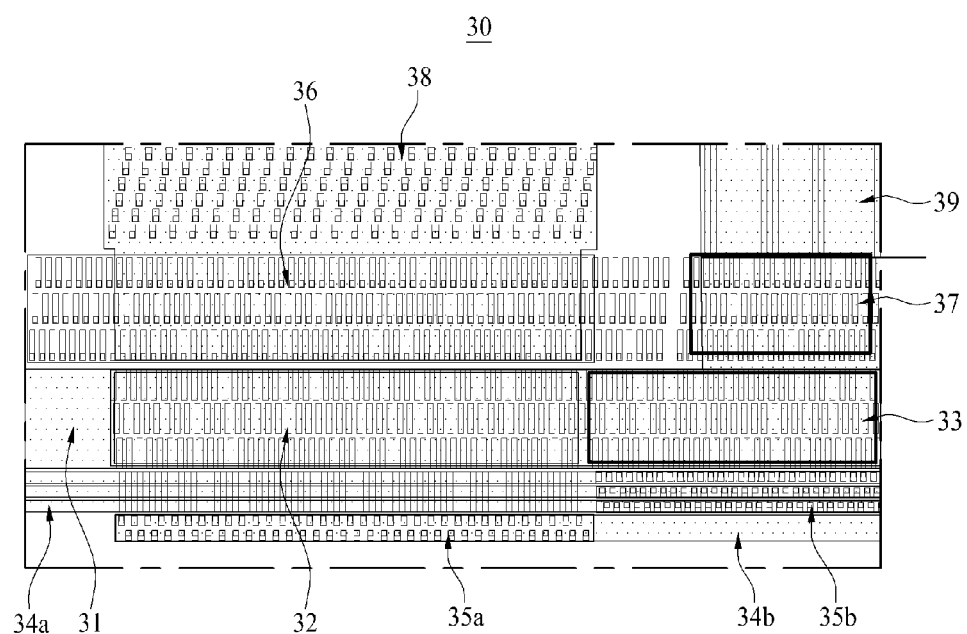
FIG. 2 is a diagram illustrating an auto probe test pattern of a related art in-cell touch LCD apparatus.

Reference will now be made in detail to the exemplary embodiments of the present invention, examples of which are illustrated in the accompanying drawings. Wherever possible, the same reference numbers will be used throughout the drawings to refer to the same or like parts.

Like reference numerals refer to like elements throughout. In the following description, when the detailed description of the relevant known function or configuration is determined to unnecessarily obscure the important point of the present invention, the detailed description will be omitted.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description. Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

An LCD apparatus according to embodiments of the present invention may include a liquid crystal panel and a driving circuit unit that drives the liquid crystal panel. The present invention relates to an auto probe test pattern which is used for an auto probe test after a lower substrate (a TFT array substrate) of the liquid crystal panel is manufactured. Thus, an upper substrate (a color filter array substrate) of the liquid crystal panel and the driving circuit unit for driving the liquid crystal panel are not shown, and their detailed descriptions are not provided.

Hereinafter, an in-cell touch LCD apparatus and an auto probe test method according to embodiments of the present invention will be described in detail with reference to the accompanying drawings.

Figure 4:
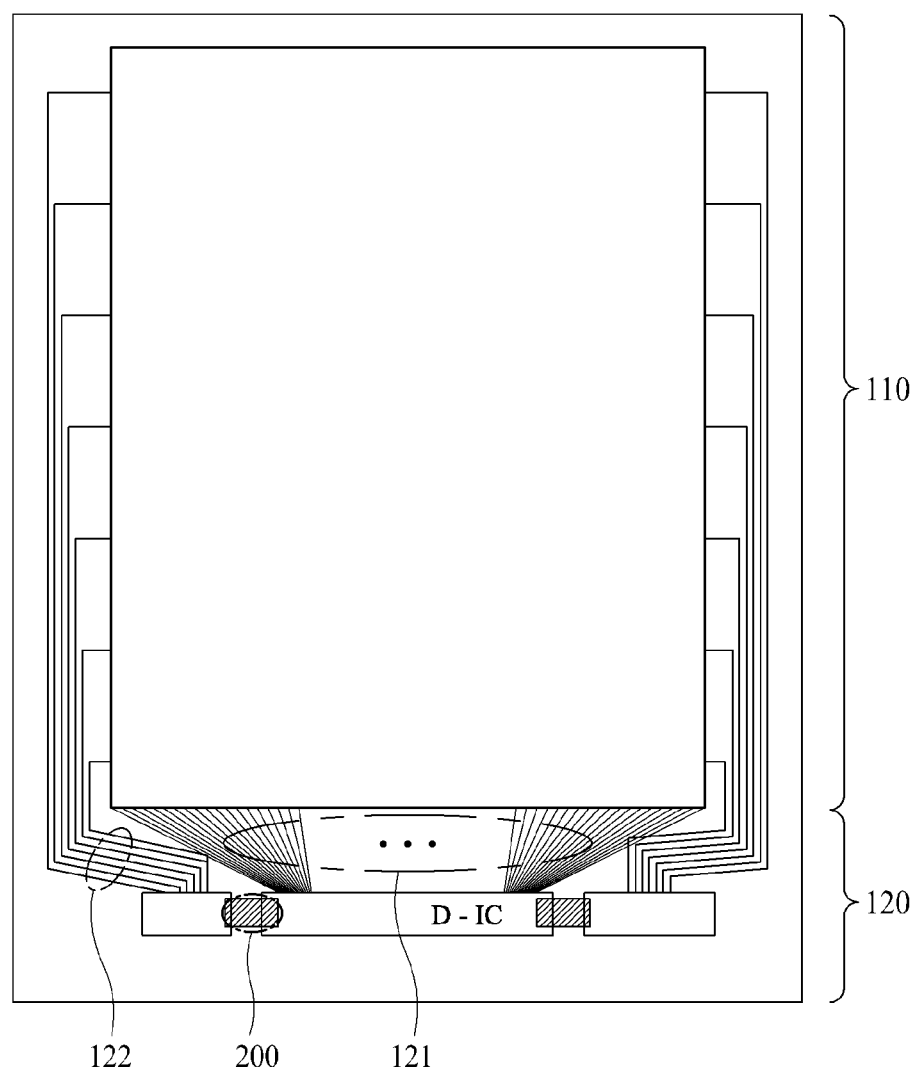
FIG. 4 is a diagram illustrating an in-cell touch LCD apparatus according to an embodiment of the present invention.

FIG. 4 is a diagram illustrating an in-cell touch LCD apparatus 100 according to an embodiment of the present invention. In FIG. 4, a backlight unit that supplies light to a liquid crystal panel is not shown.

Referring to FIG. 4, the in-cell touch LCD apparatus 100 according to an embodiment of the present invention may include an active area 110, where an image is displayed, and a pad area 120 disposed outside the active area 110. A drive IC is mounted in or bonded to the pad area 120, and a plurality of link lines 121 and a plurality of touch routing lines 122 are disposed in the pad area 120. Also, an auto probe test pattern 200 is disposed in the pad area 120.

The drive IC may be connected to the plurality of link lines 121 which are provided in the pad area 120 and may respectively supply, to a plurality of pixels, signals for displaying an image. Also, the drive IC may be connected to the plurality of touch routing lines 122 and may supply a touch driving signal to a touch electrode. The drive IC may include a timing controller, a gate driver, a data driver, a touch driver, and a power supply. The elements of the drive IC are known to those skilled in the art, and thus, their detailed descriptions are not provided.

Figure 5:
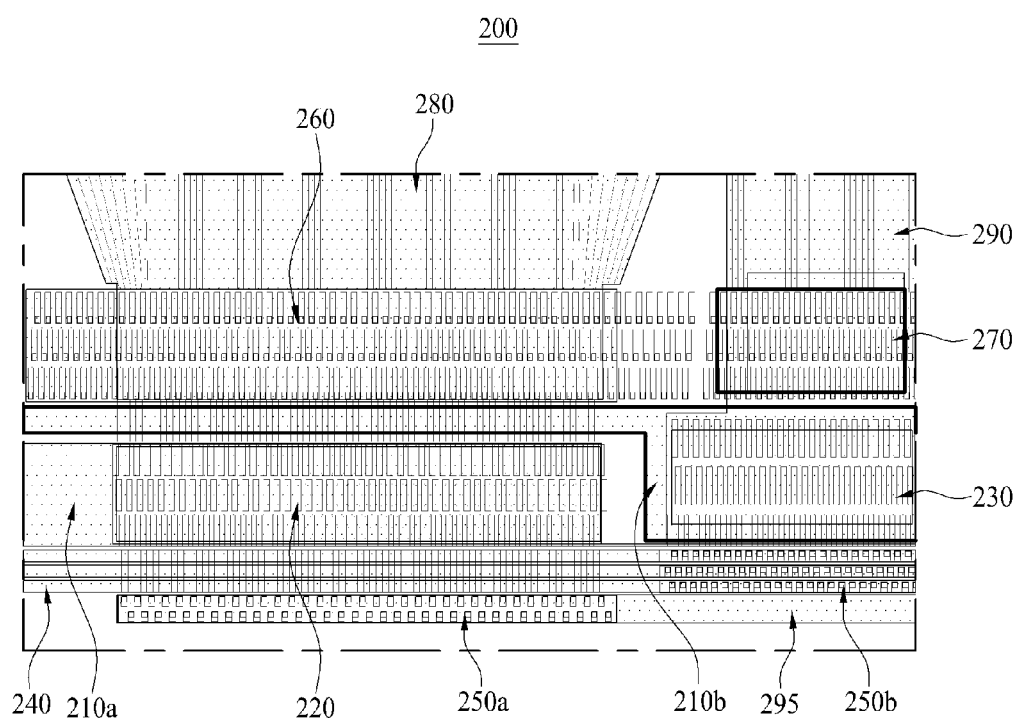
FIG. 5 is a diagram illustrating an auto probe test pattern of an in-cell touch LCD apparatus according to an embodiment of the present invention.

FIG. 5 is a diagram illustrating an auto probe test pattern 200 of the in-cell touch LCD apparatus 100 according to an embodiment of the present invention.

Referring to FIG. 5, the auto probe test pattern 200 of the in-cell touch LCD apparatus 100 according to an embodiment of the present invention may include a common voltage enable signal line 210a, a data enable signal line 210b, a common voltage switching unit 220, a data switching unit 230, a data signal line 240, a common voltage jumping part 250a (in some of the figures also referred to as "Vcom signal Jumping part"), a data jumping part 250b (in some of the figures also referred to as "Data (RGB) signal Jumping part"), a plurality of drive IC bonding parts 260 and 270, a common voltage link line 280, a data link line 290, and a common voltage signal line 295 (also referred to as "Vcom signal line").

In FIG. 5, reference numeral "260" refers to a common voltage output pin bonding part, to which a common voltage output pin is bonded, among the drive IC bonding parts 260 and 270. Also, reference numeral "270" refers to a data output pin bonding part, to which a data output pin is bonded, among the drive IC bonding parts 260 and 270.

FIG. 6 is a diagram illustrating an auto probe test method for an LCD apparatus according to an embodiment of the present invention.

To provide a description with reference to FIG. 6, a voltage of ±5 V may be supplied as a data voltage, and a voltage of −1 V may be supplied as a common voltage. The common voltage switching unit 220 may include a plurality of common voltage switching thin film transistors (TFTs). Each of the common voltage switching TFTs (AP Tr1) of the common voltage switching unit 220 may be turned on by a common voltage enable signal (also referred to as "Vcom enable") supplied through the common voltage enable signal line 210a. The common voltage switching TFTs (AP Tr1) may be turned on, and thus, the common voltage applied through the common voltage jumping part 250a may be output to the common voltage output pin bonding part 260.

The common voltage output pin bonding part 260 may output the common voltage to the common voltage link line 280. Therefore, the common voltage may be supplied to a plurality of common electrodes (a plurality of touch electrodes) disposed in an active area A/A.

The data switching unit 230 may include a plurality of data switching TFTs (AP Tr2). Each of the data switching TFTs (AP Tr2) of the data switching unit 230 may be turned on by a data enable signal supplied through the data enable signal line 210b. The data switching TFTs (AP Tr2) may be turned on, and thus, R, G, and B data applied through the data signal lines 240 may be output to the data output pin bonding part 270.

The data output pin bonding part 270 may output the R, G, and B data to a plurality of the data link lines 290. Therefore, the R, G, and B data may be respectively supplied to a plurality of pixels disposed in the active area A/A.

In the auto probe test pattern 200 of the in-cell touch LCD apparatus 100 according to an embodiment of the present invention, the common voltage enable signal line 210a may be separated from the data enable signal line 210b. That is, the common voltage enable signal line 210a may be physically separated from the data enable signal line 210b. The two lines 210a and 210b may be laterally spaced apart by a non-zero distance. The two lines 210a and 210b may be non-overlapping.

Moreover, the common voltage switching unit 220 may be separated from the data switching unit 230. That is, the common voltage switching unit 220 may be physically separated from the data switching unit 230. The two units 220 and 230 may be laterally spaced apart by a non-zero distance. The two units 220 and 230 may be non-overlapping.

As described above, since the common voltage enable signal line 210a is physically separated from the data enable signal line 210b, the common voltage enable signal and the data enable signal may be separately supplied to the common voltage switching unit 220 and the data switching unit 230, respectively.

Figure 7:
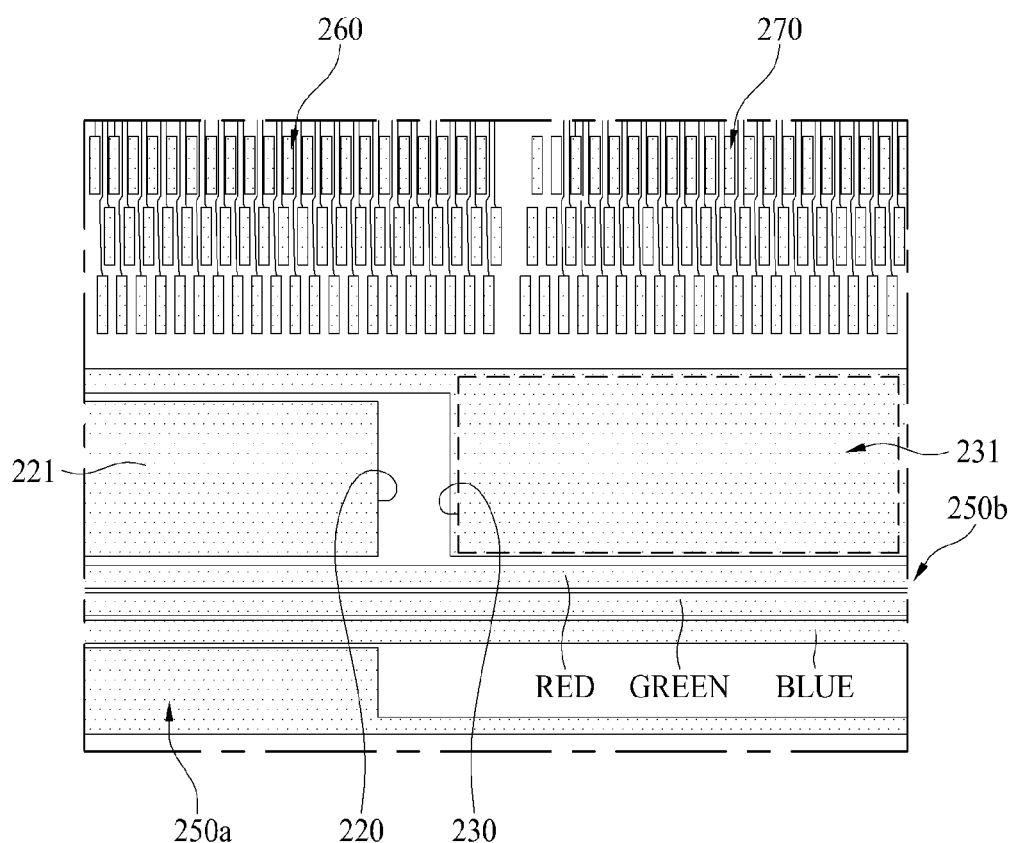
FIG. 7 is a diagram illustrating a gate layer of an auto probe test pattern.
Figure 8:
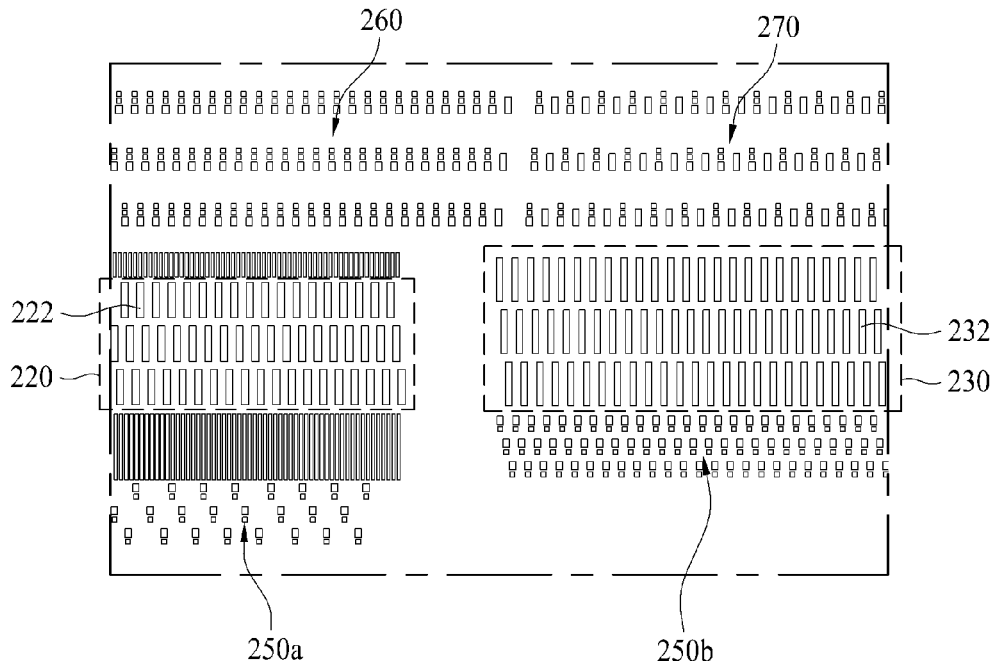
FIG. 8 is a diagram illustrating an active layer of an auto probe test pattern.
Figure 9:
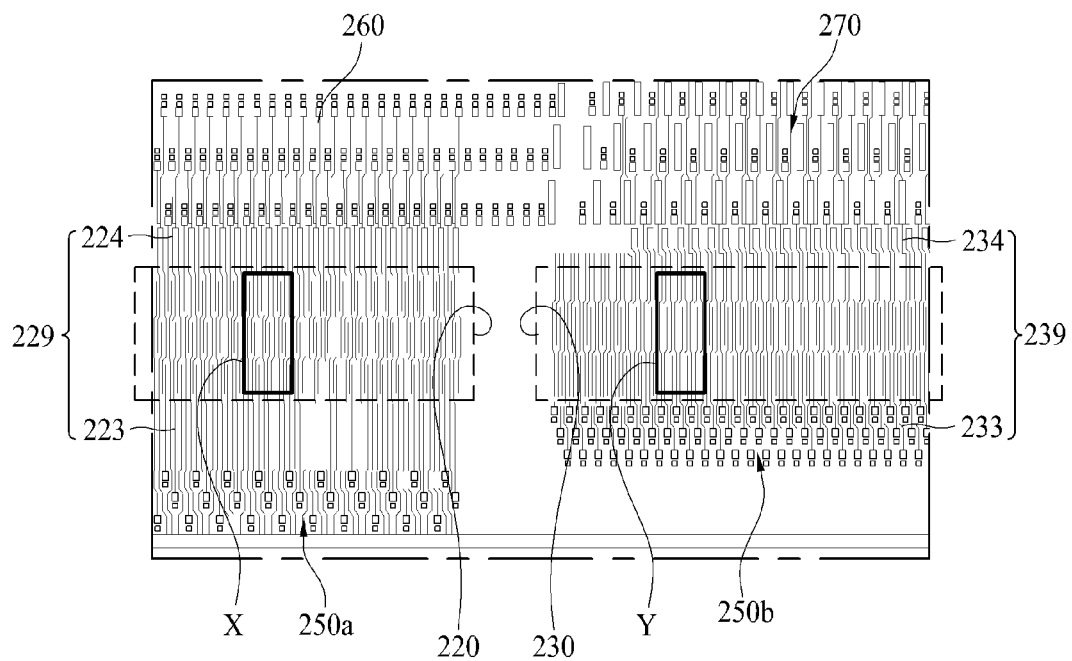
FIG. 9 is a diagram illustrating a source/drain layer of an auto probe test pattern.

FIG. 7 is a diagram illustrating a gate layer of an auto probe test pattern. FIG. 8 is a diagram illustrating an active layer of an auto probe test pattern. FIG. 9 is a diagram illustrating a source/drain layer of an auto probe test pattern. In FIGS. 7 to 9, a gate insulator, an inorganic passivation layer, and an organic passivation layer are not shown.

To describe the gate layer of FIG. 6, a gate metal may be patterned, and thus, the common voltage enable signal line 210a and the data enable signal line 210b may be disposed to be physically separated from each other.

The common voltage enable signal line 210a may be connected to a common voltage gate metal layer 221 of the common voltage switching unit 220. Also, the data enable signal line 210b may be connected to a data gate metal layer 231 of the data switching unit 230.

Here, the common voltage gate metal layer 221 of the common voltage switching unit 220 may be physically separated from the data gate metal layer 231 of the data switching unit 230.

Moreover, a gate layer of the common voltage jumping part 250a may be disposed to be physically separated from a gate layer of the data jumping part 250b. Also, a gate layer of the common voltage output pin jumping part 260 may be disposed to be physically separated from a gate layer of the data output pin jumping part 270.

To describe the active layer of FIG. 8, a common voltage active layer 222 may be disposed on the common voltage gate metal layer 221. Also, a data active layer 232 may be disposed on the data gate metal layer 231. As described above, common voltage active layers of a plurality of common voltage switching TFTs (AP Tr1) may be disposed to be physically separated from data active layers 232 of a plurality of data switching TFTs AP Tr2.

Here, a TFT may not be provided in the common voltage jumping part 250a, the data jumping part 250b, the common voltage output pin jumping part 260, and the data output pin jumping part 270, and moreover, an active layer may be disposed as a dummy layer on a gate layer of each of the common voltage jumping part 250a, the data jumping part 250b, the common voltage output pin jumping part 260, and the data output pin jumping part 230.

To describe the source/drain layer of FIG. 9, a common voltage source/drain metal layer 229 may be disposed on the common voltage active layers 222. A data source/drain metal layers 239 may be disposed on the data active layers 232. As described above, common voltage source/drain metal layers 229 of the plurality of common voltage switching TFTs (AP Tr1) may be disposed to be physically separated from data source/drain metal layers 239 of the plurality of data switching TFTs AP Tr2.

The common voltage source/drain metal layers 229 may include a plurality of first common voltage metal layers 223 connected to the common voltage jumping part 250a and a plurality of second common voltage metal layers 224 connected to the common voltage link lines 280 through the common voltage output pin bonding part 260.

Moreover, the data source/drain metal layers 239 may include a plurality of first data metal layers 233 connected to the data jumping part 250b and a plurality of second data metal layers 234 connected to the data link lines 290 through the data output pin bonding part 270.

As described above, the common voltage gate metal layer 221, the common voltage active layer 222, and the common voltage source/drain metal layer 229 may be sequentially stacked, and thus, the plurality of common voltage switching TFTs (AP Tr1) may be provided in the common voltage switching unit 220.

Moreover, the data gate metal layer 231, the data active layer 232, and the data source/drain metal layer 239 may be sequentially stacked, and thus, the plurality of data switching TFTs (AP Tr2) may be provided in the data switching unit 230.

As described above, in the auto probe test pattern 200 of the in-cell touch LCD apparatus 100 according to an embodiment of the present invention, since the common voltage enable signal line 210a is separated from the data enable signal line 210b and the common voltage switching unit 220 is separated from the data switching unit 230. Therefore, the common voltage enable signal and the data enable signal may be separately supplied.

As described above, the common voltage enable signal line 210a is physically separated from the data enable signal line 210b, and in the auto probe test, if the common voltage enable signal and the data enable signal are separately supplied, the coupling of a data voltage and the common voltage cannot occur despite a polarity of the data voltage being inverted.

Therefore, in the auto probe test, horizontal dimming is prevented from occurring due to the coupling of the data voltage and the common voltage.

As another example of the present invention, the common voltage enable signal line 210a may be physically separated from the data enable signal line 210b, and moreover, in the auto probe test, a data having a low voltage may be applied as a low value.

Hereinabove, it has been described that the data voltage is supplied as a voltage of ±5 V and the common voltage is supplied as a voltage of −1 V, but the data voltage may be applied as a value which is relatively lower than ±5 V.

As another example, the data voltage and the common voltage may be applied as the same voltage value.

As described above, in the auto probe test, when a value of the data voltage is supplied as a lower value than ±5 V or the data voltage and the common voltage are applied as the same voltage value, horizontal dimming is prevented from occurring.

FIG. 10 is a diagram illustrating a data signal line 240 of an auto probe test pattern.

Referring to FIG. 10, for example, in an RGB model where a plurality of pixels in an active area include R, G, and B pixels, a data signal line 240 may be configured with three lines including a red (R) line, a green (G) line, and a blue (B) line, as shown in the upper half of FIG. 10.

As another example, in an RGBW model where a plurality of pixels in the active area include R, G, B, and white (W) pixels, the data signal line 240 may be configured with four lines including a red (R) line, a green (G) line, a blue (B) line, and a white (W) line, as shown in the lower half of FIG. 10.

Figure 11A:
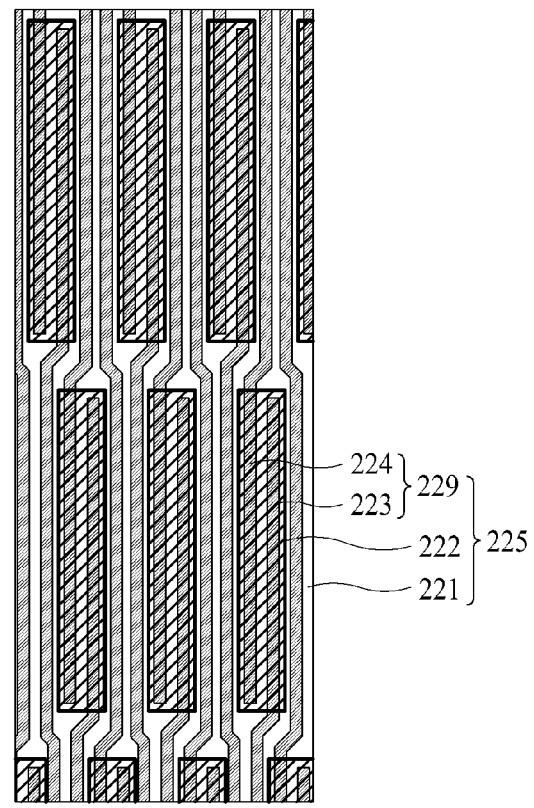
FIG. 11A is an enlarged exemplary diagram of a region X illustrated in FIG. 9.
Figure 11B:
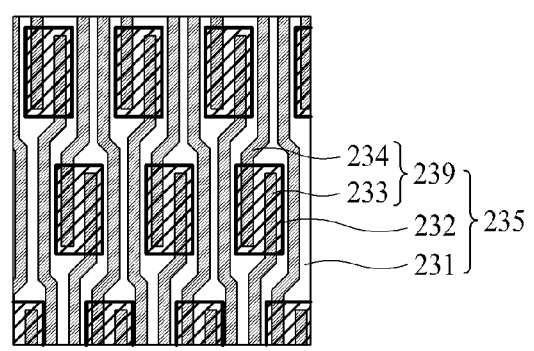
FIG. 11B is an enlarged exemplary diagram of a region Y illustrated in FIG. 9.

In the LCD apparatus including the above-described elements according to the embodiments of the present invention, the common voltage enable signal line 210a may be physically separated from the data enable signal line 210b so that the data enable signal and the common voltage enable signal are separately supplied when performing the auto probe test. Accordingly, in the auto probe test, the coupling of the data voltage and the common voltage is prevented, and thus, the horizontal dimming of a touch block may be prevented FIG. 11A is an enlarged exemplary diagram of a region X illustrated in FIG. 9, and FIG. 11B is an enlarged exemplary diagram of a region Y illustrated in FIG. 9.

As described above, the auto probe test pattern 200 applied to the in-cell touch LCD apparatus according to an embodiment of the present invention may include the common voltage enable signal line 210a through which the common voltage enable signal is applied, the common voltage switching unit 220 that is turned on by the common voltage enable signal to output the common voltage to the common voltage link lines 280, the data enable signal line 210b through which the data enable signal is applied, and the data switching unit 230 that is turned on by the data enable signal to respectively output data voltages to the data link lines 290.

Here, the common voltage enable signal line 210a and the data enable signal line 210b may be disposed to be separated from each other.

The common voltage switching unit 220 may include the plurality of common voltage switching TFTs (AP Tr1), and the data switching unit 230 may include the plurality of data switching TFTs (AP Tr2).

The common voltage enable signal line 210a may be connected to the common voltage gate metal layer 221 configuring each of the common voltage switching TFTs (AP Tr1), and the data enable signal line 210b may be connected to the data gate metal layer 231 configuring each of the data switching TFTs (AP Tr2). In this case, the common voltage gate metal layer 221 of the common voltage switching TFT (AP Tr1) and the data gate metal layer 231 of the data switching TFT (AP Tr2) may be disposed to be separated from each other.

As illustrated in FIG. 11A, the common voltage active layer 222 configuring the common voltage switching TFT may be disposed on the common voltage gate metal layer 221 configuring each of the common voltage switching TFTs (AP Tr1), and the common voltage source/drain metal layer 229 configuring the common voltage switching TFT may be disposed on the common voltage active layer 222.

The common voltage source/drain metal layer 229 may include the first common voltage metal layer 223, connected to the common voltage jumping part 250a to which the common voltage is supplied, and the second common voltage metal layer 224 connected to the common voltage link line 280.

To provide an additional description, each of the common voltage switching TFTs (AP Tr1) may include the common voltage gate metal layer 221, the common voltage active layer 222, the first common voltage metal layer 223, and the second common voltage metal layer 224.

A gate insulation layer may be disposed between the common voltage gate metal layer 221 and the common voltage active layer 222.

The first common voltage metal layer 223 and the second common voltage metal layer 224 may be disposed on the common voltage active layer 222 to be spaced apart from each other by a certain interval.

As illustrated in FIG. 11B, the data active layer 232 configuring the data switching TFTs may be disposed on the data gate metal layer 231 configuring each of the data switching TFTs (AP Tr2), and the data source/drain metal layer 239 configuring the data switching TFTs may be disposed on the data active layer 232.

The data source/drain metal layer 239 may include the first data metal layer 233, connected to the data jumping part 250b to which the data voltage is supplied, and the second data metal layer 234 connected to the data link line 290.

To provide an additional description, each of the data switching TFTs (AP Tr2) may include the data gate metal layer 231, the data active layer 232, the first data metal layer 233, and the second data metal layer 234.

A gate insulation layer may be disposed between the data gate metal layer 231 and the data active layer 232.

The first data metal layer 233 and the second data metal layer 234 may be disposed on the data active layer 232 to be spaced apart from each other by a certain interval.

Figure 12A:
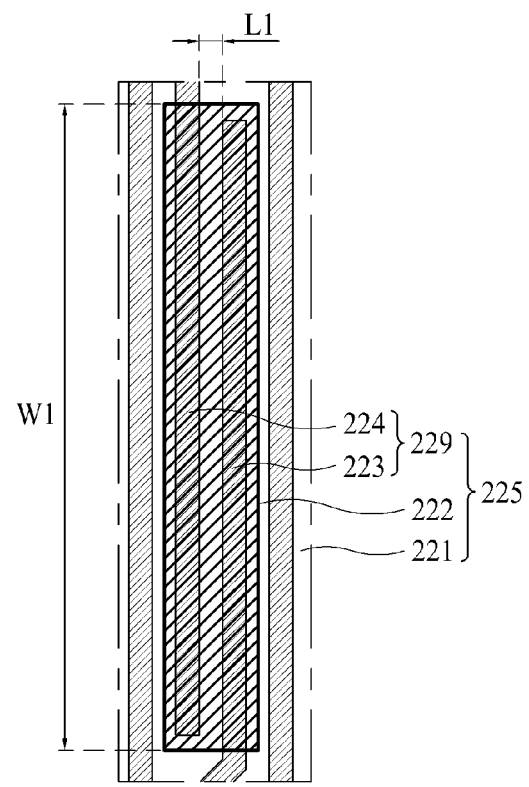
FIGS. 12A and 12B are exemplary diagrams showing a result obtained by comparing sizes of a common voltage switching TFT and a data switching TFT applied to an in-cell touch LCD apparatus according to an embodiment of the present invention.
Figure 12B:
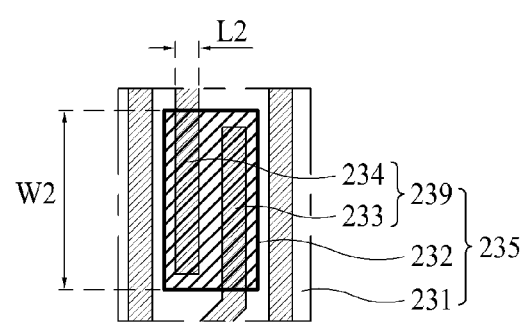

FIGS. 12A and 12B are exemplary diagrams showing a result obtained by comparing sizes of the common voltage switching TFT and the data switching TFT applied to the in-cell touch LCD apparatus according to an embodiment of the present invention.

A ratio "W1/L1" of a width "W1" to a length "L1" of the common voltage active layer 222 included in each of the common voltage switching TFTs (AP Tr1) applied to the present invention may be greater than a ratio "W2/L2" of a width "W2" to a length "L2" of the data active layer 232 included in each of the data switching TFTs (AP Tr2).

For example, when the ratio "W1/L1" of the width "W1" to the length "L1" of the common voltage active layer 222 is 60 (e.g. 300 μm/5 μm), the ratio "W2/L2" of the width "W2" to the length "L2" of the data active layer 232 may be 16 (e.g. 80 μm/5 μm).

Here, as illustrated in FIG. 9 and in FIG. 12A, the length "L1" of the common voltage active layer 222 may be an interval between the first common voltage metal layer 223, connected to the common voltage jumping part 250a to which the common voltage is supplied, and the second common voltage metal layer 224 connected to the common voltage link lines 280, in the common voltage source/drain metal layer 229 configuring the common voltage switching TFTs 225. Also, the width "W1" of the common voltage active layer 222 may be a length of an area where the first common voltage metal layer 223 or the second common voltage metal layer 224 overlaps the common voltage active layer 222.

Moreover, as illustrated in FIG. 9 and in FIG. 12B, the length "L2" of the data active layer 232 may be an interval between the first data metal layer 233, to which the data voltage is supplied, and the second data metal layer 234 connected to the data link line 290, in the data source/drain metal layer 239 configuring the data switching TFTs 235. Also, the width "W2" of the data active layer 232 may be a length of an area where the first data metal layer 233 or the second data metal layer 234 overlaps the data active layer 232.

As described above, when the ratio "W1/L1" of the width "W1" to the length "L1" of the common voltage active layer 222 is greater than the ratio "W2/L2" of the width "W2" to the length "L2" of the data active layer 232, a level of a current which is transferred to the common electrode through the common voltage switching TFTs (AP Tr1) 225 may become higher than that of a current which is transferred to a data line included in the pixel through data switching TFTs (AP Tr2) 235.

Therefore, a change amount of the common voltage caused by the data voltage is reduced. Accordingly, a coupling phenomenon where the common voltage is changed according to the data voltage is reduced, and thus, the horizontal dimming of the touch block is prevented from occurring when performing the auto probe test.

As described above, the in-cell touch LCD apparatus according to the embodiments of the present invention prevents the coupling of the data voltage and the common voltage when performing the auto probe test.

Moreover, the in-cell touch LCD apparatus according to the embodiments of the present invention prevents the horizontal dimming of the touch block from occurring when performing the auto probe test.

Moreover, the in-cell touch LCD apparatus according to the embodiments of the present invention separately supplies the data enable signal and the common voltage enable signal when performing the auto probe test.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An in-cell touch liquid crystal display (LCD) apparatus comprising:
   an active area in which a plurality of pixels are provided; and
   a pad area in which an auto probe test pattern is disposed, wherein
   the auto probe test pattern comprises:
   a common voltage enable signal line to apply a common voltage enable signal;
   a common voltage switching unit coupled to the common voltage enable signal line and configured to be turned on by the common voltage enable signal and output a common voltage;
   a data enable signal line to apply a data enable signal; and
   a data switching unit coupled to the data enable signal line and configured to be turned on by the data enable signal and output a data voltage, and
   the common voltage enable signal line and the data enable signal line are disposed separately from each other.

2. The in-cell touch LCD apparatus of claim 1, wherein the auto probe test pattern further comprises a common voltage link line configured to receive the common voltage from the common voltage switching unit, and a data link line configured to receive the data voltage from the data switching unit.

3. The in-cell touch LCD apparatus of claim 2, wherein the auto probe test pattern further comprises:
   a common voltage jumping part coupled to the common voltage switching unit; and
   a drive IC bonding part coupled to the common voltage jumping part,
   wherein the common voltage output by the common voltage switching unit is applied through the common voltage jumping part to the drive IC bonding part,
   wherein the common voltage link line is coupled to the drive IC bonding part to receive the common voltage from the drive IC bonding part.

4. The in-cell touch LCD apparatus of claim 2, wherein the auto probe test pattern further comprises:
   a data signal line coupled to the data switching unit; and
   a drive IC bonding part coupled to the data signal line,
   wherein the data switching unit is configured to receive data signals from the data signal line and output the data signals to the drive IC bonding part, wherein the data link line is coupled to the drive IC bonding part to receive the data voltage from the drive IC bonding part.

5. The in-cell touch LCD apparatus according to claim 1, wherein the common voltage switching unit comprises a plurality of common voltage switching thin film transistors configured to be turned on by the common voltage enable signal supplied through the common voltage enable signal line and output the common voltage.

6. The in-cell touch LCD apparatus according to claim 1, wherein the data switching unit comprises a plurality of data switching thin film transistors configured to be turned on by the data enable signal supplied through the data enable signal line and output red, green, and blue data signals.

7. The in-cell touch LCD apparatus according to claim 1, wherein the auto probe test pattern comprises a patterned gate metal layer, wherein the common voltage enable signal line comprises a first portion of the patterned gate metal layer and the data enable signal line comprises a second portion of the patterned gate metal layer physically separated from the first portion, and
wherein the common voltage switching unit comprises a third portion of the patterned gate metal layer and the data switching unit comprises a fourth portion of the patterned gate metal layer physically separated from the third portion.

8. The in-cell touch LCD apparatus according to claim 1, further comprising a plurality of touch routing lines in the pad area, and a drive IC coupled to the touch routing lines and configured to supply a touch driving signal to a touch electrode in the active area.

9. A method of operating an in-cell touch liquid crystal display (LCD) apparatus, the method comprising:
applying a common voltage enable signal to a common voltage enable signal line of an in-cell LCD apparatus; and
applying a data enable signal to a data enable signal line of the in-cell LCD apparatus, wherein the in-cell LCD apparatus comprises:
an active area in which a plurality of pixels are provided; and
a pad area in which an auto probe test pattern is disposed,
wherein
the auto probe test pattern comprises:
the common voltage enable signal line to apply the common voltage enable signal;
a common voltage switching unit coupled to the common voltage enable signal line and configured to be turned on by the common voltage enable signal and output a common voltage;
the data enable signal line to apply the data enable signal; and
a data switching unit coupled to the data enable signal line and configured to be turned on by the data enable signal and output a data voltage, and
wherein the common voltage enable signal line and the data enable signal line are disposed separately from each other.

10. The method of claim 9, wherein the common voltage enable signal and the data enable signal are applied simultaneously.

11. The method of claim 9, further comprising inverting a polarity of the data enable signal while applying the common voltage signal.

12. The method of claim 9, wherein applying the common voltage signal and the data enable signal comprises:

applying the common voltage signal having a negative polarity to the common voltage signal line; and
while applying the common voltage signal having the negative polarity to the common voltage enable signal line, applying the data enable signal having a negative polarity to the data enable signal line, subsequently changing the polarity of the data enable signal to a positive polarity, and subsequently applying the data enable signal having the positive polarity to the data enable signal line.

13. A method of manufacturing an in-cell touch liquid crystal display (LCD) apparatus, the method comprising:
forming a plurality of pixels in an active area of the in-cell LCD apparatus; and
forming an auto probe test pattern in a pad area of the in-cell LCD apparatus,
wherein forming the auto probe test pattern comprises:
forming a gate metal layer and patterning the gate metal layer so as to form a common voltage enable signal line through which a common voltage enable signal can be applied from a first portion of the patterned gate metal layer, and a data enable signal line through which a data enable signal can be applied from a second portion of the patterned gate metal layer, wherein the first and second portions of the patterned gate metal layer are physically separated from one another;
forming a common voltage switching unit that is coupled to the common voltage enable signal line and configured to be turned on by the common voltage enable signal and output a common voltage; and
forming a data switching unit that is coupled to the data enable signal line and configured to be turned on by the data enable signal and output a data voltage.

14. The method of claim 13, wherein the common voltage switching unit comprises a third portion of the patterned gate metal layer and the data switching unit comprise a fourth portion of the patterned gate metal layer, wherein the third and fourth portions of the patterned gate metal layer are physically separated from one another.

15. The method of claim 13, further comprising forming a common voltage link line in the pad area and coupled to the common voltage switching unit so as to supply the common voltage to at least one common electrode in the active area, and forming a data link line in the pad area and coupled to the data switching unit so as to provide the data voltage to the plurality of pixels in the active area.

16. The in-cell touch LCD apparatus of claim 1, further comprising: a plurality of common voltage link lines and a plurality of data link lines disposed in the pad area,
wherein
the common voltage switching unit outputs the common voltage the plurality of common voltage link lines, and
the data switching unit outputs the data voltage to the plurality of data link lines.

17. The in-cell touch LCD apparatus of claim 16, wherein the common voltage switching unit comprises a plurality of common voltage switching thin film transistors (TFTs), and
the data switching unit comprises a plurality of data switching TFTs.

18. The in-cell touch LCD apparatus of claim 17, wherein the common voltage enable signal line and the data enable signal line are disposed to be separated from each other,
the common voltage enable signal line is connected to a common voltage gate metal layer configuring each of the common voltage switching TFTs, and the data enable signal line is connected to a data gate metal layer configuring each of the data switching TFTs.

19. The in-cell touch LCD apparatus of claim 18, wherein the common voltage gate metal layer of each of the common voltage switching TFTs and the data gate metal layer of each of the data switching TFTs are disposed to be separated from each other.

20. The in-cell touch LCD apparatus of claim 18, wherein
a plurality of common voltage active layers configuring the common voltage switching TFTs are disposed on the common voltage gate metal layer, and the common voltage source/drain metal layers configuring the common voltage switching TFTs are disposed on the common voltage active layer, and
a plurality of data active layers configuring the data switching TFTs are disposed on the data gate metal layer, and the data source/drain metal layers configuring the data switching TFTs are disposed on the data active layers.

21. The in-cell touch LCD apparatus of claim 20, wherein the common voltage source/drain metal layers comprise a plurality of first common voltage metal layers, connected to a common voltage jumping part to which a common voltage is supplied, and a plurality of second common voltage metal layers connected to the common voltage link lines, and
the data source/drain metal layers comprise a plurality of first data metal layers, connected to a data jumping part to which the data voltage is supplied, and a plurality of second data metal layers connected to the data link lines.

22. The in-cell touch LCD apparatus of claim 17, wherein a ratio (W1/L1) of a width (W1) to a length (L1) of the common voltage active layer included in each of the common voltage switching TFTs is greater than a ratio (W2/L2) of a width (W2) to a length (L2) of the data active layer included in each of the data switching TFTs.

23. The in-cell touch LCD apparatus of claim 22, wherein
the length (L1) of the common voltage active layer is an interval between the first common voltage metal layer, connected to the common voltage jumping part to which the common voltage is supplied, the second common voltage metal layer connected to the common voltage link lines, in the common voltage source/drain metal layer configuring the common voltage switching TFT, and the width (W1) of the common voltage active layer is a length of an area where the first common voltage metal layer or the second common voltage metal layer overlaps the common voltage active layer, and
the length (L2) of the data active layer is an interval between the first data metal layer, to which the data voltage is supplied, and the second data metal layer connected to the data link line, in the data source/drain metal layer configuring the data switching TFT, and the width (W2) of the data active layer is a length of an area where the first data metal layer or the second data metal layer overlaps the data active layer.

* * * * *